Figure 3:
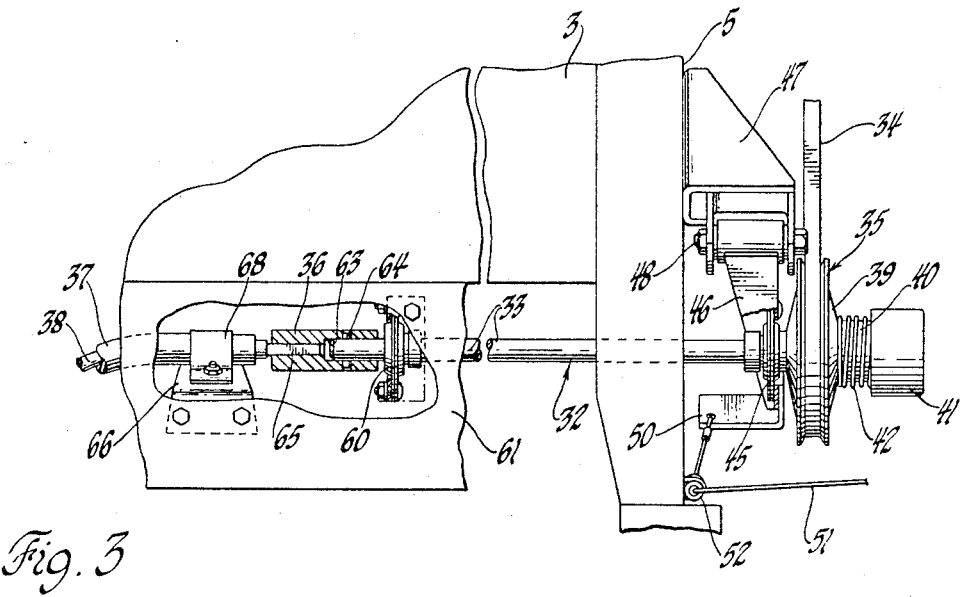

Sept. 13, 1966   W. A. WATHEN ETAL   3,272,117
BALING MACHINE
Filed Dec. 11, 1964   2 Sheets-Sheet 1
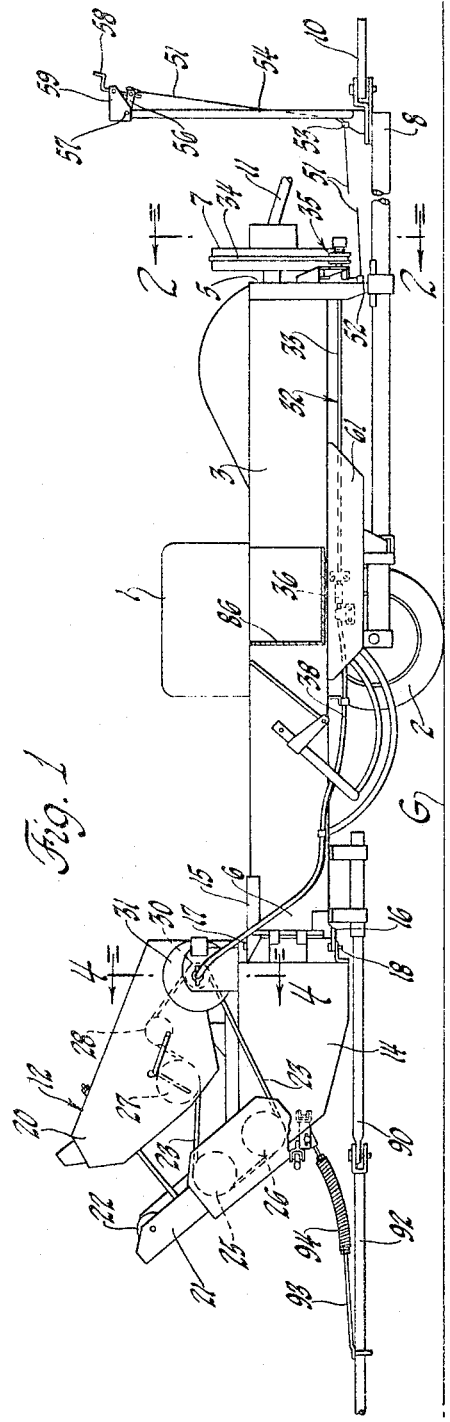
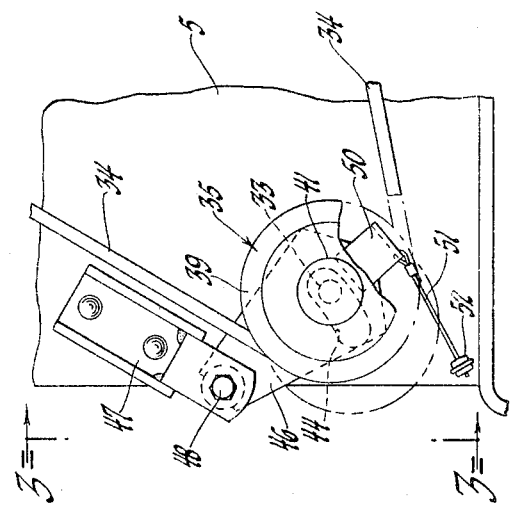
INVENTORS.
WILLIAM A. WATHEN,
FLOYD W. REUTER, &
CHARLES M. ISKENDERIAN
BY Tweedale & Gerhardt
ATTORNEYS.

INVENTORS.
WILLIAM A. WATHEN,
FLOYD W. REUTER, &
CHARLES M. ISKENDERIAN
BY Tweedale & Gerhardt
ATTORNEYS.

ned Sept. 13, 1966

3,272,117
BALING MACHINE
William A. Wathen, Detroit, Floyd W. Reuter, Dearborn, and Charles M. Iskenderian, Livonia, Mich., assignors to Massey-Ferguson Inc., Detroit, Mich.
Filed Dec. 11, 1964, Ser. No. 417,591
11 Claims. (Cl. 100—188)

This invention relates generally to baling machines and more particularly to baling machines having a pivotal bale thrower for ejecting bales from the baling machine.

It has been conventional in the prior art for bale throwers to be driven by a gasoline engine mounted directly on the thrower independently of the baling machine. Since the engine must be separately controlled from the baling machine, and since such engines are troublesome and noisy, attempts are being made to drive the thrower from the power source of the bailng machine, e.g., the power-take-off shaft of the tractor.

In order to accommodate the pivotal movement between the thrower and the baling machine, the power trains that have been developed thus far are complex and expensive. Another significant problem encountered in providing a thrower drive from the tractor power-take-off through the baling machine, is that the baler flywheel rotates at a non-uniform speed due to the variable amounts of energy utilized by the bale plunger on its compression and return strokes. Since the thrower must operate at a uniform speed, the drive train from the baler flywheel to the thrower must be able to compensate for the variable speed of the baler flywheel as well as the pivotal movement between the thrower and baler.

An object of this invention is to provide a power-take-off drive for a pivoted bale thrower in which the power to the thrower is uneffected by movement of the thrower relative to the baling machine.

A further object is to provide a flexible power train for driving a pivoted bale thrower by the main flywheel of the baling machine.

Still another object is to provide a power train for driving a pivoted bale thrower from the main flywheel of the baler in which the speed and operation of the thrower is unaffected by movement of the thrower relative to the baler as well as variations in the speed of the main flywheel of the baling machine.

In carrying out the foregoing, and other objects, a hay baler incorporating the present invention includes a flywheel mounted on the pivoted bale thrower for driving the thrower. The thrower flywheel is driven by the baler flywheel through a drive train including a flexible shaft connected to the thrower flywheel permitting the thrower to continuously operate while pivoting freely with respect to the bale casing. In order to maintain a constant speed at the thrower flywheel, a two-way slip clutch connects the flexible shaft with the thrower flywheel so that increases and decreases in the speed of the baler flywheel are not transmitted to the thrower flywheel, permitting the latter to rotate at a substantially constant speed.

Figure 4:
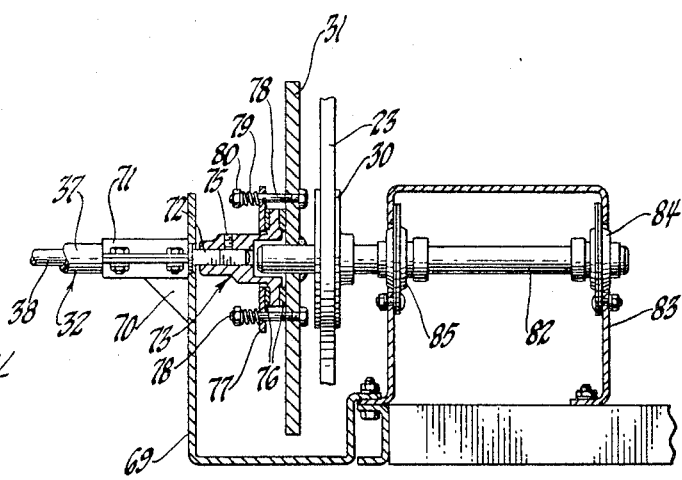

Other objects, advantages and features of the invention will become apparent from the following description taken in connection with the accompanying drawings in which:

FIG. 1 is an elevational view of a baling machine embodying the invention;
FIG. 2 is a sectional view taken on line 2—2 of FIG. 1;
FIG. 3 is a detail view taken on line 3—3 of FIG. 2; and
FIG. 4 is a sectional view taken on line 4—4 of FIG. 1.
With reference to FIG. 1, reference numeral 1 designates a baling machine having wheels 2 for supporting the baling machine on the ground indicated at G. Baler 1 includes a fore-and-aft extending bale casing 3 having a forward end 5 and a discharge end 6. Baler 1 has a forwardly extending tongue 8 which is connected to the drawbar 10 of a tractor (not shown). A flywheel 7, driven by the power-take-off shaft of the tractor through a shaft 11 provides power for operating the baling machine.

Mounted on the rear end of bale casing 3 is a thrower 12 having a housing or frame 14 which is supported on the rear end of 6 of casing 3 by pivot pins 17 and 18 extending through support brackets 15 and 16 at the upper and lower ends of bale casing 3. Thrower 12 consists of an upper thrower 20 and a lower thrower 21 each having rolls or conveyors 22 which cooperate to eject the bales in a trajectory from the baling machine. The thrower rolls are driven by a belt drive 23 supported on driven pulleys 25, 26 and 27, an idler puller 28, and a drive pulley 30. Drive pulley 30 is driven by a flywheel 31 which in turn is driven by the main flywheel 7 of the baler through a drive train indicated collectively by reference numeral 32 in FIGS. 1 and 3.

Drive train 32 includes a rigid shaft 33 having an expandable, variable speed pulley 35 on its forward end which is driven by the main flywheel 7 through a belt 34 as shown in FIGS. 1 and 3. Shaft 33 has its rear end connected by a coupler 36 with the forward end of a flexible shaft 38 having a sheath or cover 37. The expandable pulley 35 has a movable half 39 slideably supported on an enlarged end portion 40 of shaft 33. Movable portion 39 is biased toward the fixed half of pulley 35 by a spring 42 seated between portion 39 and an enlarged spring seat member 41 on the end of portion 40 of shaft 33.

Shaft 33 projects through an arcuate slot 44 formed in the forward end wall 5 of bale case 3 as shown in FIG. 2. The forward end of shaft 33 is rotatably supported in a bearing 45 carried by a swingable support arm 46 pivotally mounted on a bracket 47 by a pin 48. Bracket 47 is secured by conventional bolts or rivets to end wall 5 of bale case 3 as shown in FIG. 2.

Secured to the lower end of arm 46 is an angle member 50 (FIGS. 2 and 3) having a fore-and-aft extending leg to which is secured one end of a flexible cable 51 by means of which the position of shaft 33 is adjusted in slot 44 to vary the speed of the shaft by expanding and contracting pulley 35. Cable 51 extends through an eyelet member 52 supported on end wall 5 of the bale case and through an eyelet 53 at the base of a post 54 mounted on tongue 8.

Mounted on the upper end of post 54 is a plate 59 on which a lever 56 is pivotally connected by a pin 57. Lever 56 is threaded at its outer end to receive one end of a threaded crank member 58, and cable 51 is secured to the outer end of lever 56. By rotating crank 58, lever 56 swings upwardly and downwardly about pivot point 57 to respectively move shaft 33 to the left and right of slot 44 as viewed in FIG. 2. Movement of shaft 33 toward the left end of slot 44 (FIG. 2) causes pulley 35 to expand and thereby decrease the effective diameter of the pulley to increase the speed of shaft 33. Conversely, movement of shaft 33 toward the right in FIG. 2 permits pulley 35 to contract to thereby increase the effective diameter of the pulley and correspondingly decrease the speed of shaft 33.

Shaft 33 has its rear end rotatably supported in a bearing 60 mounted on a frame member 61 of the bale case. Coupler 36 is formed with a cylindrical recess 63 for receiving the rear end of shaft 33, and a pin 64 extends through coupler 36 and an opening in shaft 33 to nonrotatably couple shaft 33 and coupler 36 together. Coupler 36 is formed at its opposite end with a non-circular recess or opening for receiving the non-circular end 65 of flexible shaft 38. The input end of the flexible shaft 38 is secured to a bracket 66 on frame member 61 by a clamp 68. The outer sheath or cover 37 of flexible shaft 38 is thus clamped in position on bracket 66 against longitudinal or axial movement with respect to coupler 36.

With reference to FIG. 4, the output end of shaft 38 is supported on a support member 69 having a bracket 70 mounted thereon. Cover 37 of the flexible shaft is clamped onto bracket 70 by a clamp member 71 secured to bracket 70 by conventional fasteners. Shaft 38 is formed at its output end with a non-circular extension or end portion 72 which is received in a complementary opening in a slip clutch 73. Axial movement between the non-circular end portion 72 and clutch 73 is prevented by means of a set screw 75 threadedly mounted in clutch 73.

Clip clutch 73 is provided with opposite friction faces 76 engaging the opposed faces of flywheel 31 and an annular clutch disc 77 which is loosely and rotatably received on clutch member 73. The clutch disc 77 is supported on flywheel 31 by means of threaded rods 78 mounted on the flywheel and extending through suitable openings in clutch disc 77. Springs 79 are mounted on the left ends of rods 78, as viewed in FIG. 4, between clutch disc 77 and threaded nuts 80. Springs 79 bias clutch disc 77 and the friction faces 76 into engagement with the opposed faces of clutch disc 77 and flywheel 31 to frictionally couple shaft 38 with flywheel 31. Flywheel 31 and drive pulley 30 are non-rotatably mounted on a shaft 82 which in turn is rotatably supported on bearings 84 and 85 mounted in the side walls of an inverted U-shaped housing 83.

In operation of the baling apparatus, successive batches or charges of crop material are fed into the bale case through an opening 86 (FIG. 1) from a pickup unit (not shown) of conventional construction where it is compressed into a bale by a reciprocating plunger driven by flywheel 7. As each bale is formed, it is advanced rearwardly in the bale casing. Each bale is successively pushed by its preceding bale out of discharge end 6 of the bale casing into the thrower. As each bale enters the thrower, it is picked up by the thrower rolls and ejected from the baling machine into a wagon or other vehicle having a tongue 92 connected with the baler drawbar 90. A connecting rod 93 including a spring 94 connects tongue 92 with the thrower 12 so as to cause the thrower to change the direction of its trajectory as the wagon is pulled around corners by the tractor.

Since the main flywheel 7 operates the baling plunger, the speed of rotation of flywheel 7 is non-uniform. This is due to the plunger requiring greater power on its compression stroke than on the return stroke. Consequently, at such times as flywheel 7 slows, flywheel 31 will rotate faster than flexible shaft 38 against the friction forces of clutch 73. Conversely, on the return stroke of the plunger causing flywheel 7 to speed up, clutch 73 permits shaft 38 to run at a faster speed than flywheel 31. As a result of the action of the two-way slip clutch 73, the speed of flywheel 31 remains substantially uniform.

The flexible drive shaft 38 permits the thrower to swing about its vertical axis through pivot points 17 and 18 without affecting the speed of flywheel 31 and the thrower rolls. Flexible shaft 38 preferably is of the well-known type consisting a plurality of wires wound around the longitudinal axis of the shaft and capable of storing a limited amount of energy through torsion to also compensate for the non-uniform rotation between flywheel 7 and flywheel 31. This latter property, together with slip clutch 73 serves to maintain the speed of flywheel 31 substantially constant.

If desired, a spring may be provided between end wall 5 of the bale case and the swingable arm 46 on which the expandable pulley is mounted to assist in returning the pulley toward the right in FIG. 2 when it is desired to slow shaft 33. However, it has been found that a spring is not needed when cable 51 is adjusted during operation of the machine, and in many cases causes the pulley 35 to move too rapidly toward the right producing sudden slack in belt 34 which tends to throw the belt from the flywheel 7.

In some cases, it may be desirable to provide a self-aligning bearing at the rear of shaft 33 in place of the conventional bearing 60 shown in the drawings to compensate for the angular movement of shaft 33 through arcuate slot 44. However, in the illustrated embodiment the full range of movement of shaft 33 from one end to the other of slot 44 is approximately one degree. By initially positioning the shaft 33 in the center of slot 44, the shaft then moves only one-half of one degree on either side of the latter center position which has a negligible effect on bearing 60 such that the normal operating limits permit the use of a conventional bearing rather than a self-aligning bearing.

The use of the flexible drive train simplifies the drive connection between the baler and the movable thrower by eliminating the complex system of belts and pulleys which are presently required to accommodate articulation between the thrower and baler. Moreover, the combined effect of the flexible shaft's ability to torsionally store and release energy as well as the two-way slip clutch 73 maintain a substantially uniform speed of flywheel 31 regardless of the non-uniform rotation of flywheel 7.

While a specific embodiment of the invention has been illustrated and described, it will be understood by those skilled in the art that various alterations and modifications in the construction and arrangement of parts can be made without departing from the scope and spirit of the invention.

We claim:

1. A hay baler including a fore-and-aft bale casing, a bale thrower mounted on the rear end of the bale casing for side to side swinging movement, a flywheel for operating the baler, and a drive train connecting said flywheel to said thrower for driving the thrower characterized by said drive train including a flexible drive shaft having one end connected with the thrower for movement therewith relative to the bale casing and its other end supported at a point spaced from the thrower and held against longitudinal and transverse movement relative to the bale casing for transmitting the drive from said flywheel to the thrower in any position of the thrower relative to the bale casing.

2. A hay baler as defined in claim 1 further including a flywheel on said thrower for driving the thrower, and a slip clutch connected between said flexible shaft and said thrower flywheel to compensate for non-uniform rotation of said flywheels.

3. A hay baler as defined in claim 2 further including an expandable pulley driven by the baler flywheel and means coupling said flexible shaft to be driven by said expandable pulley.

4. A hay baler as defined in claim 3 further including means for selectively moving said expandable pulley toward and away from the baler flywheel to respectively contract and expand said pulley to thereby respectively decrease and increase the speed thereof.

5. In a baling machine having a bale casing, bale forming means for compressing crop material into bales within said bale casing and successively discharging the bales from the bale casing and a bale thrower mounted on the discharge end of the bale casing for pivotal movement with respect to the bale casing about a vertical axis for ejecting the bales from the bale casing, a main flywheel rotatable to drive the bale forming means, and a drive train between said main flywheel and said thrower for driving said bale thrower from said main flywheel, said drive train including a flexible shaft having one end connected to said bale thrower for movement therewith relative to the bale casing and its other end supported at a point spaced from the thrower and held against longitudinal and transverse movement relative to the bale casing thereby permitting said bale thrower to freely pivot about said vertical axis during operation.

6. The construction defined in claim 5 further including a two-way slip clutch coupling said bale thrower to the output end of said flexible shaft to compensate for non-uniform rotation of the flywheel.

7. The construction defined in claim 5 wherein said drive train further includes an expandable pulley driven by said main flywheel, and means drivingly connecting said expandable pulley with the input end of said flexible shaft.

8. The construction defined in claim 7 further including a swingable arm mounted on the bale casing, said drive train further including a non-flexible shaft having one end coupled with the input end of said flexible shaft and its other end rotatably journalled on said swingable arm near the free end thereof, said expandable pulley being mounted on said other end of said non-flexible shaft for driving said non-flexible shaft, and a belt connecting said expandable pulley with said main flywheel, movement of said expandable pulley toward and away from said main flywheel contracting and expanding said expandable pulley to selectively decrease and increase, respectively, the speed of said expandable pulley with respect to said main flywheel.

9. The construction defined in claim 8 further including an arcuate guide slot in said bale casing for receiving said other end of said non-flexible shaft, and means for adjusting said swingable arm to selectively adjust said non-flexible shaft along said slot to expand and contract said expandable pulley.

10. The construction defined in claim 9 wherein said means includes a post mounted on the baling machine, a lever pivoted at one end to said post, a crank for selectively adjusting said lever about its pivot point, and a flexible cable connected between said lever and said swingable arm for actuating said swingable arm to move the expandable pulley toward and away from said main flywheel in response to adjustment of said crank.

11. The construction defined in claim 10 further including a thrower flywheel on said bale thrower for driving said thrower, and a slip clutch coupling the output end of said flexible shaft to said thrower flywheel.

References Cited by the Examiner
UNITED STATES PATENTS

| 3,095,962 | 7/1963 | Hollyday | 198—128 |
| 3,110,392 | 11/1963 | Hollyday | 198—128 |
| 3,124,235 | 3/1964 | Hollyday | 198—128 |
| 3,127,977 | 4/1964 | Hollyday | 198—128 |

LOUIS O. MAASSEL, *Primary Examiner.*